(12) United States Patent
Coers et al.

(10) Patent No.: US 8,555,607 B2
(45) Date of Patent: Oct. 15, 2013

(54) INTEGRATED DRAPER BELT SUPPORT AND SKID SHOE IN AN AGRICULTURAL HARVESTING MACHINE

(71) Applicant: Deere & Company, Moline, IL (US)

(72) Inventors: Bruce A. Coers, North Hillsdale, IL (US); Kyle A. Meeske, East Moline, IL (US); John Andrios, Geneseo, IL (US); Benjamin M. Lovett, Colona, IL (US); Corwin M. Puryk, East Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/649,285

(22) Filed: Oct. 11, 2012

(65) Prior Publication Data

US 2013/0239537 A1 Sep. 19, 2013

Related U.S. Application Data

(63) Continuation of application No. 13/043,256, filed on Mar. 8, 2011, now abandoned, which is a continuation of application No. 12/109,758, filed on Apr. 25, 2008, now abandoned.

(51) Int. Cl.
*A01D 43/00* (2006.01)
(52) U.S. Cl.
USPC .............................................. 56/181; 56/158
(58) Field of Classification Search
USPC .................... 56/181, 158, 296, 303
See application file for complete search history.

(56) References Cited

U.S. PATENT DOCUMENTS

| 391,383 | A | | 10/1888 | Myrick |
|---|---|---|---|---|
| 515,549 | A | | 2/1894 | Miller |
| 923,084 | A | | 5/1909 | Simmons |
| 1,580,646 | A | | 4/1926 | Brattly |
| 1,862,101 | A | | 6/1932 | Pax |
| 1,881,411 | A | | 10/1932 | Love et al. |
| 1,914,837 | A | | 6/1933 | Thoen |
| 1,928,236 | A | | 9/1933 | Thoen |
| 1,990,054 | A | | 2/1935 | Thoen |
| 1,996,294 | A | | 4/1935 | Hume et al. |
| 2,099,471 | A | | 11/1937 | Edgington |
| 2,102,710 | A | * | 12/1937 | Hume et al. ............... 56/158 |
| 2,237,517 | A | | 4/1941 | Anderson |
| 2,240,066 | A | | 4/1941 | Bingham |
| 2,347,365 | A | | 4/1944 | Paradise |
| 2,389,193 | A | | 11/1945 | Graves |
| 2,438,065 | A | | 3/1948 | Love |
| 2,599,438 | A | | 6/1952 | Downing et al. |
| 2,795,922 | A | | 6/1957 | Hume |
| 2,912,814 | A | | 11/1959 | Witt et al. |

(Continued)

FOREIGN PATENT DOCUMENTS

AU 613293 12/1989
AU 617821 1/1990

(Continued)

*Primary Examiner* — Árpád Fábián-Kovács
(74) *Attorney, Agent, or Firm* — Taylor IP, P.C.

(57) ABSTRACT

A cutting platform for use with an agricultural harvesting machine includes at least one platform section. Each platform section has a cutterbar assembly movable in a localized manner in upwards and downwards directions, an endless belt with a leading edge, and a plurality of skid shoes. Each skid shoe extends rearwardly from the cutterbar assembly and has an upper surface defining a belt support for the leading edge of the endless belt.

14 Claims, 8 Drawing Sheets

(56) References Cited

U.S. PATENT DOCUMENTS

| | | |
|---|---|---|
| 2,915,870 A | 12/1959 | Hume |
| 2,999,348 A | 9/1961 | Cunningham |
| 3,092,116 A | 6/1963 | Stroburg et al. |
| 3,283,485 A | 11/1966 | Koch et al. |
| 3,304,699 A | 2/1967 | Koch et al. |
| 3,324,639 A | 6/1967 | Halls et al. |
| 3,349,549 A | 10/1967 | Van Der Lely |
| 3,412,735 A | 11/1968 | Bichel et al. |
| 3,597,907 A | 8/1971 | Neal |
| 3,763,637 A | 10/1973 | Schmitt |
| 3,783,594 A | 1/1974 | Watt et al. |
| 3,813,859 A | 6/1974 | Fuller et al. |
| 3,851,451 A | 12/1974 | Agness et al. |
| 3,866,400 A | 2/1975 | May |
| 3,866,718 A | 2/1975 | Hiergeist |
| 3,885,377 A | 5/1975 | Jones |
| 3,886,718 A | 6/1975 | Talbot |
| 3,941,003 A | 3/1976 | Garrison et al. |
| 3,953,959 A | 5/1976 | Decruyenaere |
| 3,967,439 A | 7/1976 | Mott |
| 3,982,383 A | 9/1976 | Mott |
| 4,008,556 A | 2/1977 | Wegscheid et al. |
| 4,011,709 A | 3/1977 | Mott et al. |
| 4,091,602 A | 5/1978 | Williams et al. |
| 4,124,970 A | 11/1978 | Berhardt |
| 4,171,606 A | 10/1979 | Ziegler et al. |
| 4,191,006 A | 3/1980 | Kerber et al. |
| 4,195,467 A | 4/1980 | Lawrence et al. |
| 4,198,803 A | 4/1980 | Quick et al. |
| 4,199,925 A | 4/1980 | Quick et al. |
| 4,206,582 A | 6/1980 | Molzahn et al. |
| 4,206,583 A | 6/1980 | Week et al. |
| 4,206,584 A | 6/1980 | Johnson et al. |
| 4,211,057 A | 7/1980 | Dougherty et al. |
| 4,216,641 A | 8/1980 | Koch et al. |
| 4,227,363 A | 10/1980 | Kerber et al. |
| 4,246,742 A | 1/1981 | Clark et al. |
| 4,253,295 A | 3/1981 | Knepper |
| 4,266,391 A | 5/1981 | McDuffie et al. |
| 4,266,392 A | 5/1981 | Knepper et al. |
| 4,296,592 A | 10/1981 | McIlwain |
| 4,307,560 A | 12/1981 | Swanson |
| 4,330,983 A | 5/1982 | Moore |
| 4,330,984 A | 5/1982 | Hillman |
| 4,332,126 A | 6/1982 | Van Auwelaer et al. |
| 4,372,103 A | 2/1983 | McIlwain et al. |
| 4,407,110 A | 10/1983 | McIlwain et al. |
| 4,409,778 A | 10/1983 | McNaught |
| 4,409,780 A | 10/1983 | Beougher et al. |
| 4,414,793 A | 11/1983 | Halls |
| 4,429,517 A | 2/1984 | Lohrentz et al. |
| 4,441,307 A | 4/1984 | Enzmann |
| 4,446,683 A | 5/1984 | Rempel et al. |
| 4,473,993 A | 10/1984 | Jennings et al. |
| 4,493,181 A | 1/1985 | Glendenning et al. |
| 4,538,404 A | 9/1985 | Heimark, Jr. et al. |
| 4,541,229 A | 9/1985 | Elijah |
| 4,553,379 A | 11/1985 | Kalverkamp |
| 4,560,008 A | 12/1985 | Carruthers |
| 4,573,308 A | 3/1986 | Ehrecke et al. |
| 4,599,852 A | 7/1986 | Kerber et al. |
| 4,627,226 A | 12/1986 | De Coene |
| 4,660,360 A | 4/1987 | Hardesty et al. |
| 4,665,685 A | 5/1987 | Rupprecht |
| 4,674,626 A | 6/1987 | Adcock |
| 4,700,537 A | 10/1987 | Emmert |
| 4,722,172 A | 2/1988 | Pearce |
| 4,724,661 A | 2/1988 | Blakeslee et al. |
| 4,733,523 A | 3/1988 | Dedeyne et al. |
| 4,757,673 A | 7/1988 | Gayman |
| 4,776,153 A | 10/1988 | DePauw et al. |
| 4,813,296 A | 3/1989 | Guinn |
| 4,815,265 A | 3/1989 | Guinn et al. |
| 4,835,954 A | 6/1989 | Enzmann |
| 4,845,931 A | 7/1989 | Bruner et al. |
| 4,863,419 A | 9/1989 | Sansone |
| 4,875,331 A | 10/1989 | Ostrup et al. |
| 4,875,889 A | 10/1989 | Hagerer et al. |
| 4,891,932 A | 1/1990 | Johnson |
| 4,897,071 A | 1/1990 | Desnijder et al. |
| 4,909,025 A | 3/1990 | Reissig et al. |
| 4,923,014 A | 5/1990 | Mijnders |
| 4,938,010 A | 7/1990 | Guinn et al. |
| 4,942,724 A | 7/1990 | Diekhans et al. |
| 4,956,966 A | 9/1990 | Patterson |
| 5,005,343 A | 4/1991 | Patterson |
| 5,157,905 A | 10/1992 | Talbot et al. |
| 5,243,810 A | 9/1993 | Fox et al. |
| 5,282,771 A | 2/1994 | Underwood |
| 5,338,257 A | 8/1994 | Underwood |
| 5,459,986 A | 10/1995 | Talbot et al. |
| 5,464,371 A | 11/1995 | Honey |
| RE35,543 E | 7/1997 | Patterson |
| 5,661,964 A | 9/1997 | Paulson et al. |
| 5,711,140 A | 1/1998 | Burmann |
| 5,791,128 A | 8/1998 | Rogalsky |
| 5,845,472 A | 12/1998 | Arnold |
| 5,865,019 A | 2/1999 | Hurlburt et al. |
| 5,924,270 A | 7/1999 | Bruns |
| 6,029,429 A | 2/2000 | Fox et al. |
| 6,070,401 A | 6/2000 | Johnson |
| 6,116,010 A | 9/2000 | Salley |
| 6,202,397 B1 | 3/2001 | Watts et al. |
| 6,247,297 B1 | 6/2001 | Becker |
| 6,305,154 B1 | 10/2001 | Yang et al. |
| 6,351,931 B1 | 3/2002 | Shearer |
| 6,510,681 B2 | 1/2003 | Yang et al. |
| 6,588,187 B2 | 7/2003 | Engelstad et al. |
| 6,658,832 B2 | 12/2003 | Wubbels et al. |
| 6,663,525 B1 | 12/2003 | McKee et al. |
| 6,666,007 B2 | 12/2003 | Schroeder |
| 6,675,568 B2 | 1/2004 | Patterson et al. |
| 6,705,067 B2 | 3/2004 | Schroeder et al. |
| 6,758,029 B2 | 7/2004 | Beaujot |
| 6,782,683 B2 | 8/2004 | Buermann |
| 6,817,166 B2 | 11/2004 | Dunn |
| 6,826,894 B2 | 12/2004 | Thiemann et al. |
| 6,843,719 B1 | 1/2005 | Sacquitne |
| 6,865,871 B2 | 3/2005 | Hosel |
| 6,889,492 B1 | 5/2005 | Polk et al. |
| 7,121,074 B1 | 10/2006 | Regier et al. |
| 7,159,378 B2 | 1/2007 | Rickert |
| 7,162,855 B2 | 1/2007 | Boeckmann et al. |
| 7,191,582 B2 | 3/2007 | Bomleny |
| 7,197,865 B1 | 4/2007 | Enns et al. |
| 7,207,164 B2 | 4/2007 | Bomleny |
| 7,222,474 B2 | 5/2007 | Rayfield et al. |
| 7,222,475 B2 | 5/2007 | Bomleny et al. |
| 7,306,513 B2 | 12/2007 | Mackin et al. |
| 7,350,345 B2 | 4/2008 | Slabbinck et al. |
| 7,373,769 B2 * | 5/2008 | Talbot et al. ................... 56/303 |
| 7,380,392 B2 | 6/2008 | Willem et al. |
| 7,395,651 B2 | 7/2008 | Kost et al. |
| 7,401,458 B2 | 7/2008 | Priepke |
| 7,412,816 B2 | 8/2008 | Coers et al. |
| 7,426,817 B2 | 9/2008 | Coers |
| 7,430,846 B2 | 10/2008 | Bomleny et al. |
| 7,444,798 B2 | 11/2008 | Patterson et al. |
| 7,467,506 B2 | 12/2008 | Lovett et al. |
| 7,472,533 B2 | 1/2009 | Talbot et al. |
| 7,478,521 B2 | 1/2009 | Coers et al. |
| 7,478,522 B1 | 1/2009 | Lovett et al. |
| 7,520,115 B2 | 4/2009 | Coers et al. |
| 7,520,118 B1 | 4/2009 | Priepke |
| 7,540,130 B2 | 6/2009 | Coers et al. |
| 7,543,428 B1 | 6/2009 | Puryk et al. |
| 7,549,280 B2 | 6/2009 | Lovett et al. |
| 7,600,364 B2 * | 10/2009 | Lovett et al. ................... 56/181 |
| 7,640,720 B1 * | 1/2010 | Lovett et al. ................... 56/181 |
| 7,802,417 B2 * | 9/2010 | Sauerwein et al. ............ 56/181 |
| 8,205,421 B2 * | 6/2012 | Sauerwein et al. ............ 56/181 |
| 2002/0129591 A1 | 9/2002 | Patterson et al. |
| 2003/0074876 A1 | 4/2003 | Patterson et al. |
| 2004/0065069 A1 | 4/2004 | Dunn et al. |

(56) References Cited

U.S. PATENT DOCUMENTS

| | | |
|---|---|---|
| 2004/0163374 A1 | 8/2004 | Rickert |
| 2005/0016147 A1 | 1/2005 | Patterson et al. |
| 2007/0193243 A1 | 8/2007 | Schmidt et al. |
| 2007/0204582 A1 | 9/2007 | Coers et al. |
| 2007/0204583 A1 | 9/2007 | Coers |
| 2007/0204584 A1 | 9/2007 | Coers et al. |
| 2007/0204585 A1 | 9/2007 | Lovett et al. |
| 2007/0204586 A1 | 9/2007 | Coers |
| 2007/0204589 A1 | 9/2007 | Coers et al. |
| 2007/0251202 A1 | 11/2007 | Coers et al. |
| 2007/0283673 A1 | 12/2007 | Coers et al. |
| 2007/0289278 A1 | 12/2007 | Coers et al. |
| 2008/0022646 A1 | 1/2008 | Patterson et al. |
| 2008/0072560 A1 | 3/2008 | Talbot |
| 2008/0078155 A1 | 4/2008 | Coers et al. |
| 2008/0092508 A1 | 4/2008 | Talbot et al. |
| 2008/0098705 A1 | 5/2008 | Salley et al. |
| 2008/0161077 A1 | 7/2008 | Honey |
| 2008/0271426 A1 | 11/2008 | Lohrentz et al. |
| 2008/0276590 A1 | 11/2008 | Sauerwein et al. |
| 2009/0007533 A1 | 1/2009 | Lovett et al. |
| 2009/0007534 A1 | 1/2009 | Sauerwein et al. |
| 2009/0084080 A1* | 4/2009 | Coers et al. ............ 56/15.8 |
| 2009/0094957 A1 | 4/2009 | Schmidt et al. |
| 2009/0107094 A1 | 4/2009 | Bich et al. |
| 2009/0266044 A1* | 10/2009 | Coers et al. ............ 56/208 |
| 2009/0277144 A1 | 11/2009 | Honas et al. |
| 2009/0277145 A1 | 11/2009 | Sauerwein |
| 2009/0277146 A1 | 11/2009 | Sauerwein et al. |
| 2009/0277147 A1 | 11/2009 | Honas et al. |
| 2009/0277148 A1 | 11/2009 | Sethi |
| 2009/0288383 A1 | 11/2009 | Sauerwein et al. |
| 2009/0293441 A1 | 12/2009 | Sauerwein |
| 2010/0043375 A1* | 2/2010 | Schmidt et al. ............ 56/181 |
| 2010/0095646 A1* | 4/2010 | Schmidt et al. ............ 56/14.3 |
| 2010/0269472 A1* | 10/2010 | Coers et al. ............ 56/15.8 |
| 2011/0154794 A1* | 6/2011 | Coers et al. ............ 56/181 |

FOREIGN PATENT DOCUMENTS

| | | |
|---|---|---|
| AU | 615149 | 11/1990 |
| AU | 627677 | 8/1991 |
| AU | 657126 | 10/1992 |
| AU | 771097 | 11/2001 |
| AU | 2000256968 B2 | 1/2002 |
| AU | 780865 | 1/2003 |
| AU | 2002257470 B2 | 1/2003 |
| AU | 2003204399 B2 | 6/2003 |
| AU | 2004203614 A1 | 2/2005 |
| AU | 2005227401 A1 | 8/2006 |
| AU | 2006207881 A1 | 10/2006 |
| AU | 2006201952 A1 | 11/2006 |
| AU | 2006201953 A1 | 11/2006 |
| AU | 2006201954 A1 | 11/2006 |
| AU | 2007203263 A1 | 1/2008 |
| CA | 887374 A | 12/1971 |
| CA | 1052105 | 4/1979 |
| CA | 1055322 | 5/1979 |
| CA | 1056162 | 6/1979 |
| CA | 1079984 | 6/1980 |
| CA | 1081474 | 7/1980 |
| CA | 1160326 | 1/1984 |
| CA | 1163098 | 3/1984 |
| CA | 1204599 | 5/1986 |
| CA | 1238194 | 6/1988 |
| CA | 1267539 | 4/1990 |
| CA | 1274697 | 10/1990 |
| CA | 2307173 A1 | 3/2001 |
| CA | 2307176 A1 | 10/2001 |
| CA | 2387898 A1 | 12/2002 |
| DE | 3512619 A1 | 10/1986 |
| DE | 102006043314 A1 | 10/2007 |
| EP | 0331893 A2 | 9/1989 |
| EP | 0717922 A1 | 6/1996 |
| EP | 0848898 A1 | 6/1998 |
| EP | 1629707 A1 | 3/2006 |
| EP | 1867228 A1 | 12/2007 |
| GB | 314315 | 3/1928 |
| GB | 746108 | 3/1956 |
| GB | 777590 | 6/1957 |
| GB | 825842 | 12/1959 |
| GB | 2208581 A | 12/1989 |
| SU | 445392 | 5/1975 |
| WO | 8700393 | 1/1987 |
| WO | 0219793 A1 | 3/2002 |
| WO | 2005055699 A1 | 6/2005 |
| WO | 2006133116 A2 | 12/2006 |
| WO | 2007095430 A2 | 8/2007 |

\* cited by examiner

INTEGRATED DRAPER BELT SUPPORT AND SKID SHOE IN AN AGRICULTURAL HARVESTING MACHINE

CROSS REFERENCE TO RELATED APPLICATIONS

This is a continuation of U.S. patent application Ser. No. 12/109,758, entitled "INTEGRATED DRAPER BELT SUPPORT AND SKID SHOE IN AN AGRICULTURAL HARVESTING MACHINE", filed Apr. 25, 2008, which is a continuation of U.S. patent application Ser. No. 13/043,256, entitled "INTEGRATED DRAPER BELT SUPPORT AND SKID SHOE IN AN AGRICULTURAL HARVESTING MACHINE", filed Mar. 8, 2011 which is incorporated herein by reference.

FIELD OF THE INVENTION

The present invention relates to agricultural harvesting machines, and, more particularly, to agricultural combines including a draper cutting platform.

BACKGROUND OF THE INVENTION

An agricultural harvesting machine such as a combine includes a head and a feeder housing which remove the crop material from the field, gather the crop material and transport the crop material to a separator. In the case of thinner stemmed crops such as soybeans, wheat, etc. which may be cut with a sickle bar carrying a plurality of knives, the head may also be known as a cutting platform. The separator removes the grain crop material from the non-grain crop material. The grain is cleaned and deposited in a grain tank. When the grain tank becomes full, an unloading auger which is positioned alongside the combine during harvesting is moved to the unloading position in which the auger extends approximately perpendicular to the longitudinal axis of the combine. The combine drives alongside a vehicle into which the grain is to be unloaded, such as a semi-trailer, and the unloading auger is actuated to discharge the grain into the vehicle.

A cutting platform may generally be of two types. One type typically has a sheet metal floor with a dual feed auger near the rear of the cutting platform for feeding the crop material longitudinally to the feeder housing. A cutting platform of this type with auger feed is more common.

Another type of cutting platform, also known as a draper platform, utilizes a flat, wide belt, referred to as a draper or draper belt to convey crop material. The arrangement and number of belts vary among platforms. One style of draper platform has two side belts that convey crop material longitudinally, to the center of the platform, where a center feed belt moves the crop material laterally into the feeder housing. Each belt is wrapped around a pair of rollers, one being a drive roller and the other being an idler roller. An example of this type draper arrangement is disclosed in U.S. Pat. No. 6,202,397, which is assigned to the assignee of the present invention.

An advantage of a draper platform is that larger amounts of crop material can be transported without plugging, etc. For example, with wide platforms approaching 40 feet or even larger, the amount of crop material transported to the feeder housing can be substantial. With an auger feed platform, the crop material may bind between the auger and the back wall of the platform. In contrast, with a draper platform, the crop material is carried on top of the belt with less chance for plugging.

Draper platforms currently in use have a rigid framework not allowing the framework to flex to any appreciable extent during use. The draper platform can be placed in a "float" position such that the cutterbar at the leading edge does not dig into the ground, but the leading edge of the platform itself cannot flex across the width of the platform as a result of uneven ground terrain. This results in some crop material being missed in ground depressions, etc., while also possibly causing a part of the cutterbar to dig into localized ground elevations (e.g., small mounds, etc.). Of course, missed crop material directly translates into missed revenue, and localized gouging of soil can cause additional repair expenses resulting from broken knives, knife guards, etc.

Rigid platforms as described above typically include skid shoes at the bottom of the leading edge. The skid shoes are generally angled rearwardly and downwardly from the leading edge and are movable upwards and downwards at least slightly relative to each other. The skid shoes are typically stand alone components with sheet metal extending between and covering the bottom, leading edge of the skid shoes. In the case of a draper platform, belt carriers which are separate from the skid shoes carry the return run of the draper belt.

What is needed in the art is a draper platform which better follows the ground contour during operation.

SUMMARY OF THE INVENTION

The invention comprises, in one form thereof, a cutting platform for use with an agricultural harvesting machine, including at least one platform section. Each platform section includes a cutterbar assembly movable in a localized manner in upwards and downwards directions, an endless belt with a leading edge, and a plurality of skid shoes. Each skid shoe extends rearwardly from the cutterbar assembly and has an upper surface defining a belt support for the leading edge of the endless belt.

The invention comprises, in another form thereof, a skid shoe for use with a cutting platform in an agricultural harvesting machine. The skid shoe includes a forward end for attachment with a cutterbar assembly, a lower surface positionable in association with a ground surface over which the harvesting machine traverses, and an upper surface defining a belt support for a leading edge of an endless belt.

The invention comprises, in yet another form thereof, an agricultural harvesting machine, including a base unit with a feeder housing, and a cutting platform attached to the feeder housing. The cutting platform includes at least one platform section. Each platform section has a cutterbar assembly movable in a localized manner in upwards and downwards directions, an endless belt having a leading edge, and a plurality of skid shoes. Each skid shoe extends rearwardly from the cutterbar assembly and has an upper surface defining a belt support for the leading edge of the endless belt.

DETAILED DESCRIPTION OF THE INVENTION

Figure 1:
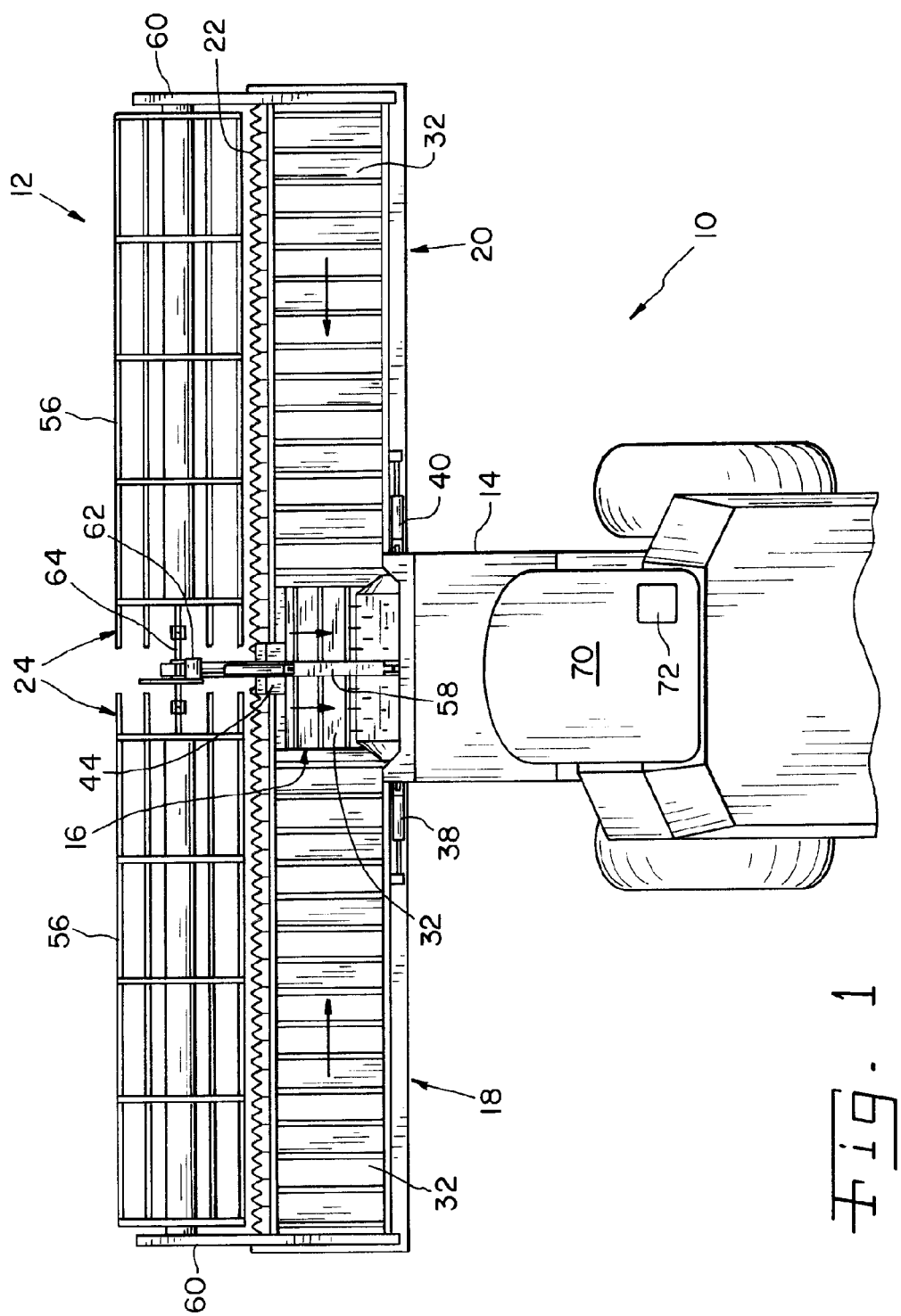
FIG. 1 is a fragmentary, top view of an agricultural combine including an embodiment of a draper platform of the present invention.
Figure 2:
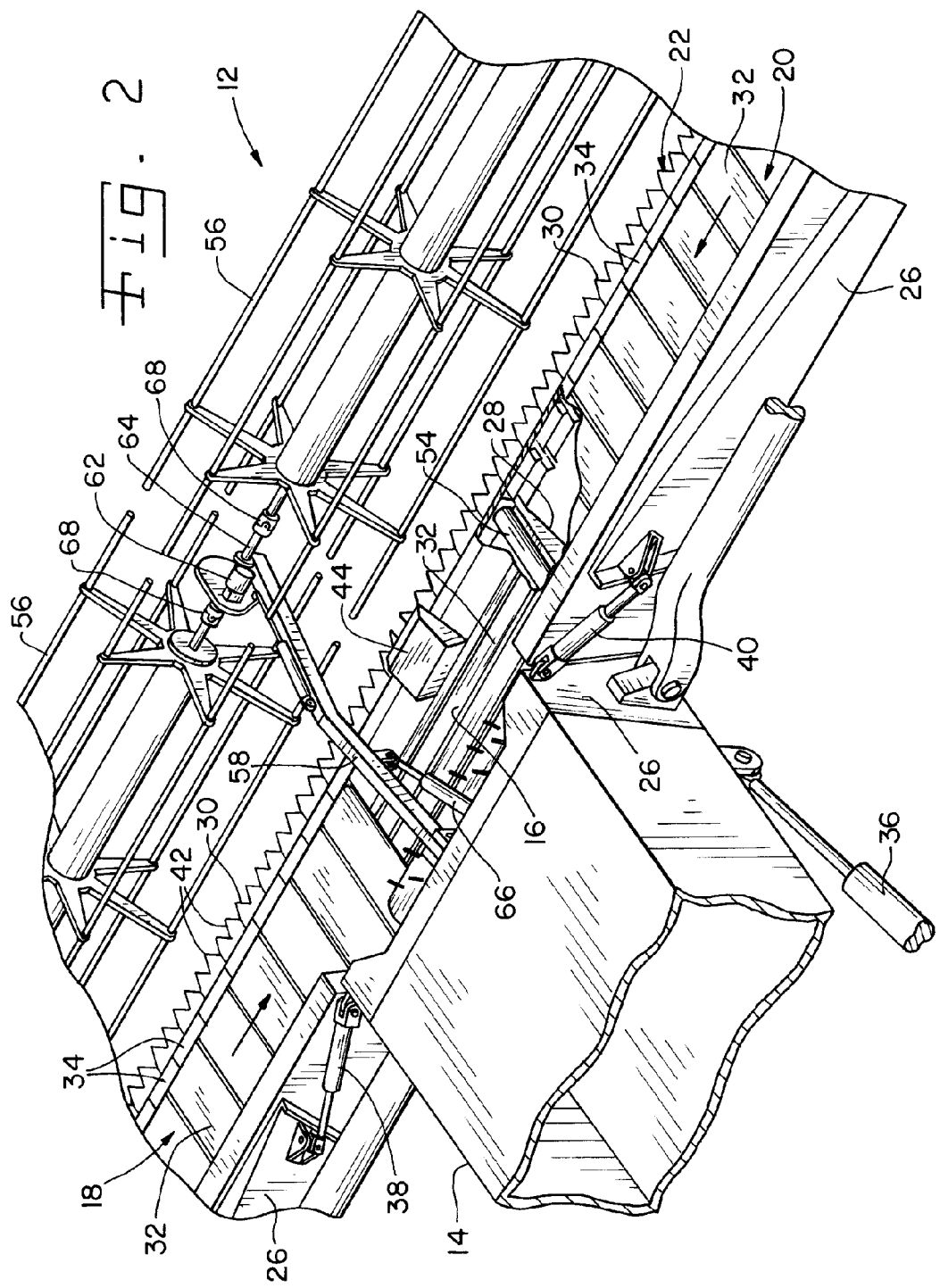
FIG. 2 is a fragmentary, perspective view of the agricultural combine of FIG. 1.
Figure 3:
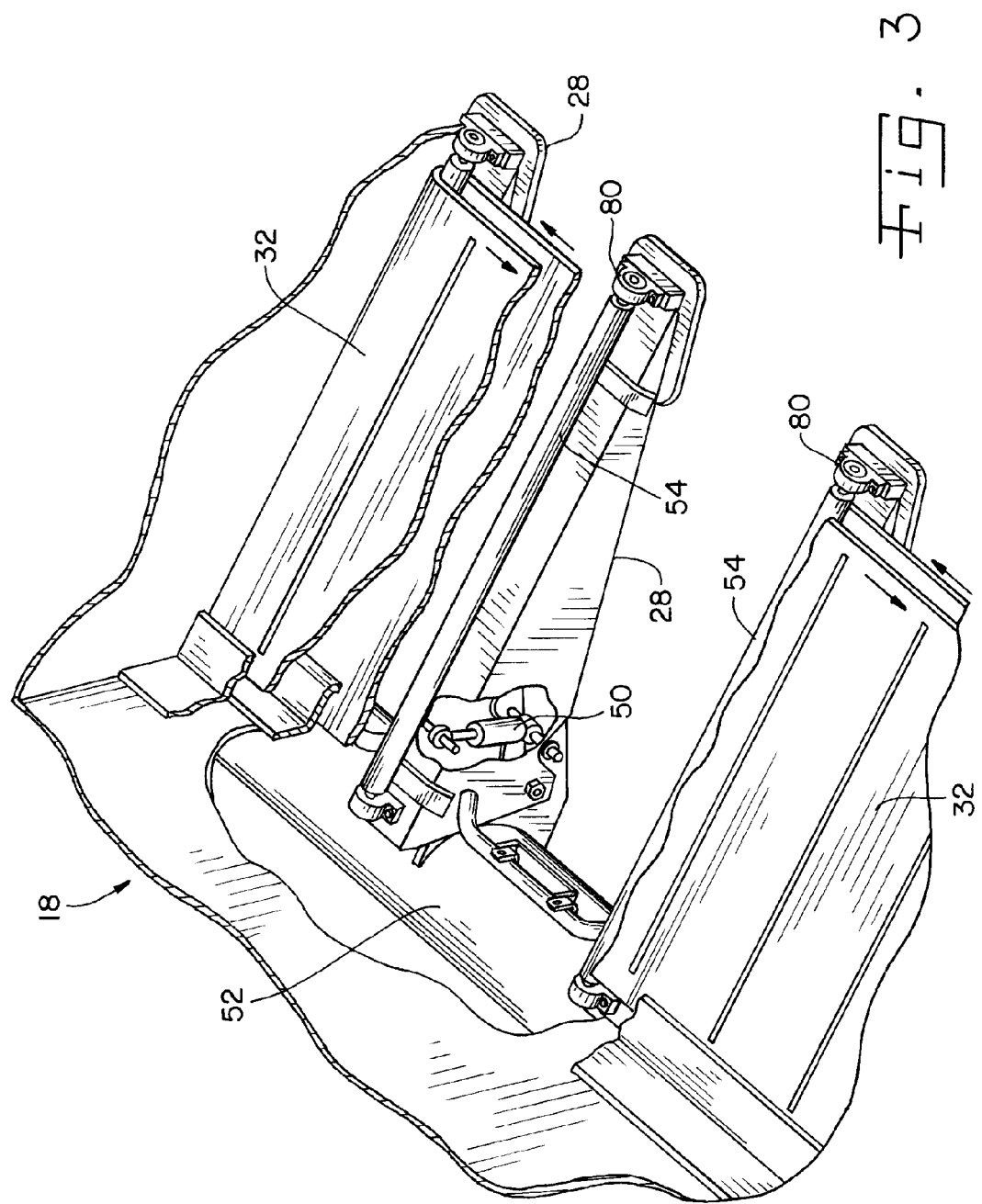
FIG. 3 is a fragmentary, perspective view of the cutting platform shown in FIGS. 1 and 2.
Figure 4:
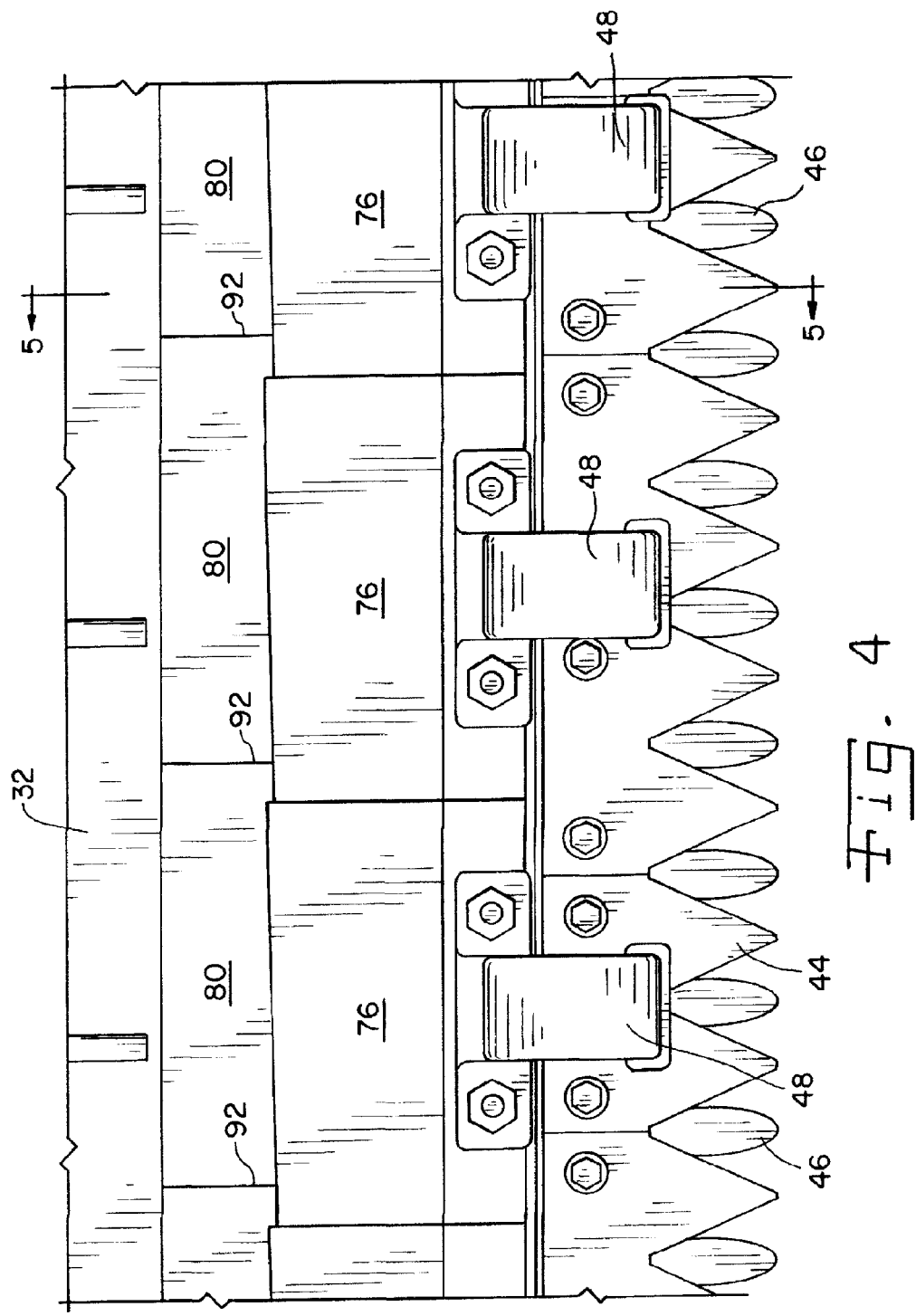
FIG. 4 is a fragmentary, top view of the leading edge of the cutting platform shown in FIGS. 1-3.

Referring now to the drawings, and, more particularly to FIGS. 1-4, there is shown an agricultural harvesting machine in the form of a combine 10 including an embodiment of a cutting platform 12 of the present invention. Combine 10 includes a feeder housing 14 which is detachably coupled with cutting platform 12. Feeder housing 14 receives the crop material from cutting platform 12, both grain and non-grain crop material, and transports the crop material to a separator within combine 10 in known manner (not shown). The grain crop material is separated from the non-grain crop material, cleaned and transported to a grain tank. The non-grain crop material is transported to a chopper, blower, etc. in known manner and distributed back to the field.

Cutting platform 12 generally includes a plurality of platform sections 16, 18 and 20, a cutterbar assembly 22 and a reel assembly 24. In the embodiment shown, platform section 16 is a center platform section, platform section 18 is a first wing platform section, and platform section 20 is a second wing platform section. Although shown with three platform sections, cutting platform 12 may be configured with more or less platform sections, depending upon the particular application.

Each platform section 16, 18 and 20 generally includes a frame 26, a plurality of float arms 28 coupled with a respective frame 26, a cutterbar 30 carried by the outboard ends of respective float arms 28, an endless belt 32, and a plurality of belt guides 34. The frame 26 of first wing platform section 18 and second wing platform section 20 are each pivotally coupled with center platform section 16, such that the outboard ends of first wing platform section 18 and second wing platform section 20 can move up and down independent from center platform section 16. To that end, a lift cylinder 36 coupled between the frame of combine 10 and feeder housing 14 lifts the entire cutting platform 12, a first tilt cylinder 38 coupled between the respective frame 26 of first wing platform section 18 and center platform section 16 pivotally moves first wing platform section 18 relative to center platform section 16, and a second tilt cylinder 40 coupled between the respective frame 26 of second wing platform section 20 and center platform section 16 pivotally moves second wing platform section 20 relative to center platform section 16.

Cutterbar assembly 22 includes two cutterbars 30 carried at the outboard ends of float arms 28 (i.e., at the leading edge of a platform section 16, 18 or 20). Each cutterbar 30 includes a plurality of knives 42 carried by a bar (not specifically shown). The particular type of knife can vary, such as a double blade knife (as shown) or a single blade knife. The bar is formed from a metal which is flexible to an extent allowing a desired degree of flexure across the width of cutting platform 12. In the embodiment shown, a majority of each cutterbar 30 is carried by a respective first wing platform section 18 or second wing platform section 20, with a lesser extent at the adjacent inboard ends of each cutterbar 30 being carried by center platform section 16. Cutterbars 30 are simultaneously driven by a single knife drive 44, providing reciprocating movement in concurrent opposite directions between cutterbars 30.

A plurality of knife guards 46 are positioned in opposition to knives 42 for providing opposing surfaces for cutting the crop material with knives 42. A plurality of keepers 48 spaced along cutterbars 30 have a distal end above cutterbars 30 for maintaining cutterbars 30 in place during reciprocating movement.

Float arms 28 may be pivoted at their connection locations with a respective frame 26. A float cylinder 50 coupled between a respective frame 26 and float arm 28 may be used for raising or lowering the outboard end of float arm(s) 28 at the leading edge of cutting platform 12. Each float cylinder 50 may also be placed in a "float" position allowing the connected float arm 28 to generally follow the ground contour during operation. More particularly, each float cylinder 50 is fluidly connected with an accumulator 52 carried by a platform section 16, 18 or 20. Accumulator 52 allows fluid to flow to and from attached float cylinders 50 such that no pressure build-up occurs. In this manner, the rams associated with each float cylinder 50 are free to move back and forth longitudinally, thereby allowing float arms 28 to follow the ground contour. When not in a float mode, float cylinders 50 can be actuated to move float arms 28 in an upward or downward direction. In the embodiment shown, each float cylinder 50 is a hydraulic cylinder, but could possibly be configured as a gas cylinder for a particular application.

Each float arm 28 is also associated with a respective roller 54. The plurality of rollers 54 for each platform section 16, 18 and 20 carry and are positioned within a loop of a respective endless belt 32. At the inboard end of first wing platform section 18 and second wing platform section 20 is a driven roller, and at the outboard end of first wing platform section 18 and second wing platform section 20 is an idler roller. The rollers positioned between the inboard drive roller and outboard idler roller at each float arm 28 also function as idler rollers. It will be appreciated that the number of float arms 28, and thus the number of rollers 54, may vary depending upon the overall width of cutting head 12 transverse to the travel direction.

Reel assembly 24 includes two reels 56, center reel support arm 58 and a pair of outer reel support arms 60. Outer reel support arms 60 are pivotally coupled at one end thereof with an outboard end of a respective first wing platform section 18 or second wing platform section 20. Outer reel support arms 60 rotationally carry a respective reel 56 at an opposite end thereof. Each outer reel support arm 60 may be selectively moved up and down using a hydraulic cylinder, and the pair of hydraulic cylinders are typically coupled in parallel so that they move together upon actuation.

Center reel support arm 58 is pivotally coupled at one end thereof with center platform section 16 above the opening leading to feeder housing 14. Center reel support arm 58 rotationally carries an inboard end of each reel 56 at an opposite end thereof. A hydraulic motor 62 or other suitable mechanical drive rotationally drives each reel 56. More particularly, hydraulic motor 62 drives a common drive shaft 64 through a chain and sprocket or other suitable arrangement (not shown). The rotational speed of reels 56 can be adjusted by an operator by adjusting the rotational speed of hydraulic motor 62.

Center reel support arm 58 may be selectively moved up and down using a hydraulic cylinder 66. Center reel support arm 58 is movable independently from outer reel support arms 60. To accommodate this independent movement, drive shaft 64 driven by hydraulic motor 62 is coupled at each end thereof via a universal joint 68 with a respective reel 56. This independent movement of center reel support arm 58 can be accomplished manually using a separate actuating switch or lever in operator's cab 70, or automatically using an electronic controller 72 located within cab 70 or other suitable location.

According to an aspect of the present invention, each platform section 16, 18 and 20 has a leading edge which is configured to allow cutterbar assembly 22 to flex an appreciable extent in a localized manner across the width of cutting platform 12.

Figure 5:
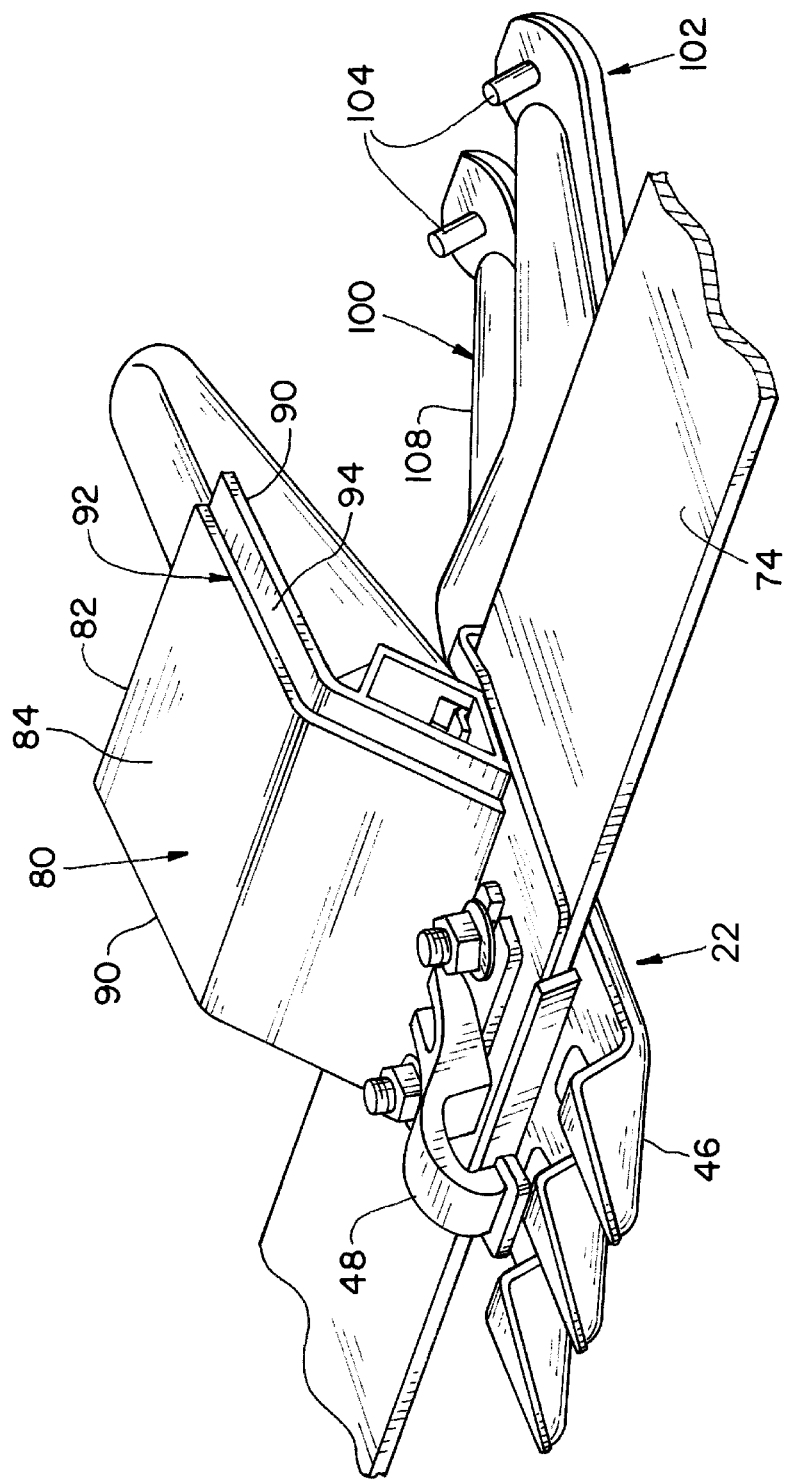
FIG. 5 is a fragmentary, front perspective view of the leading edge of the cutting platform shown in FIGS. 1-3.
Figure 6:
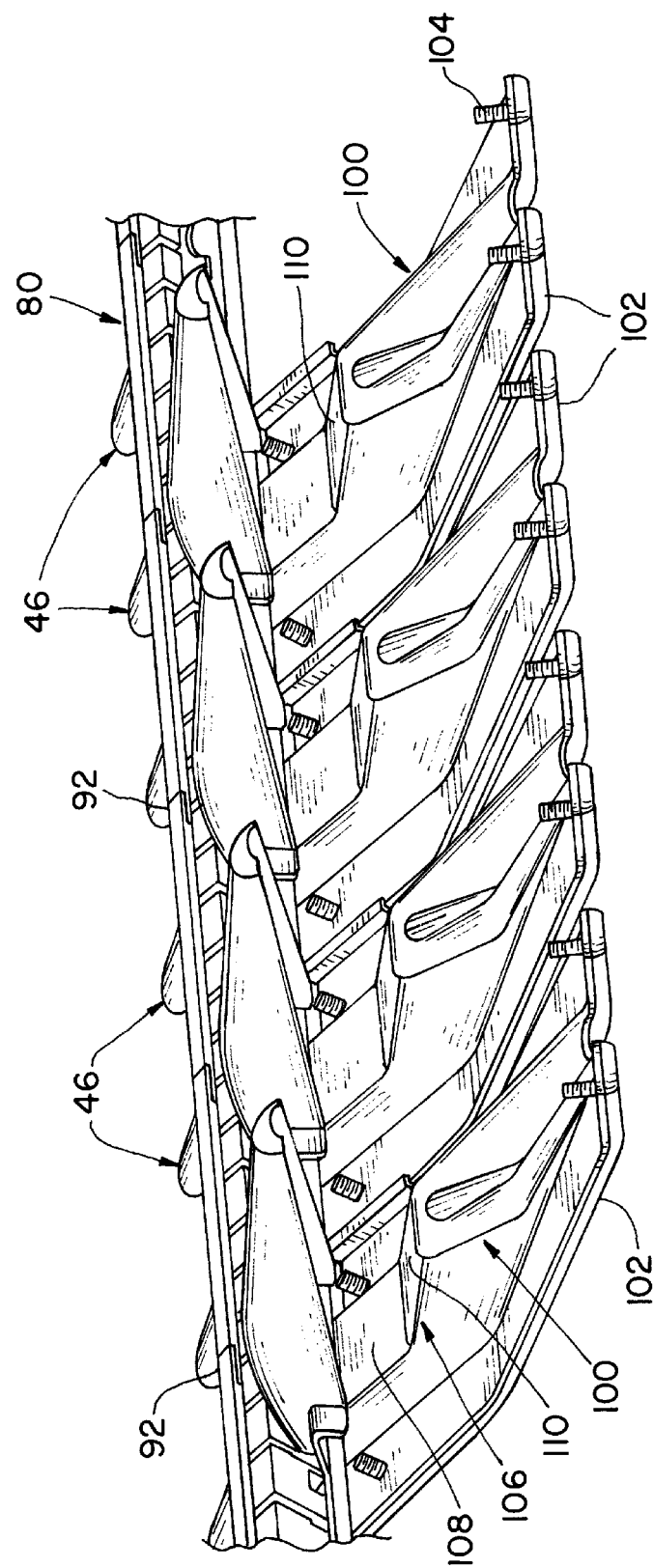
FIG. 6 is a fragmentary, rear perspective view of the leading edge shown in FIG. 5.
Figure 7:
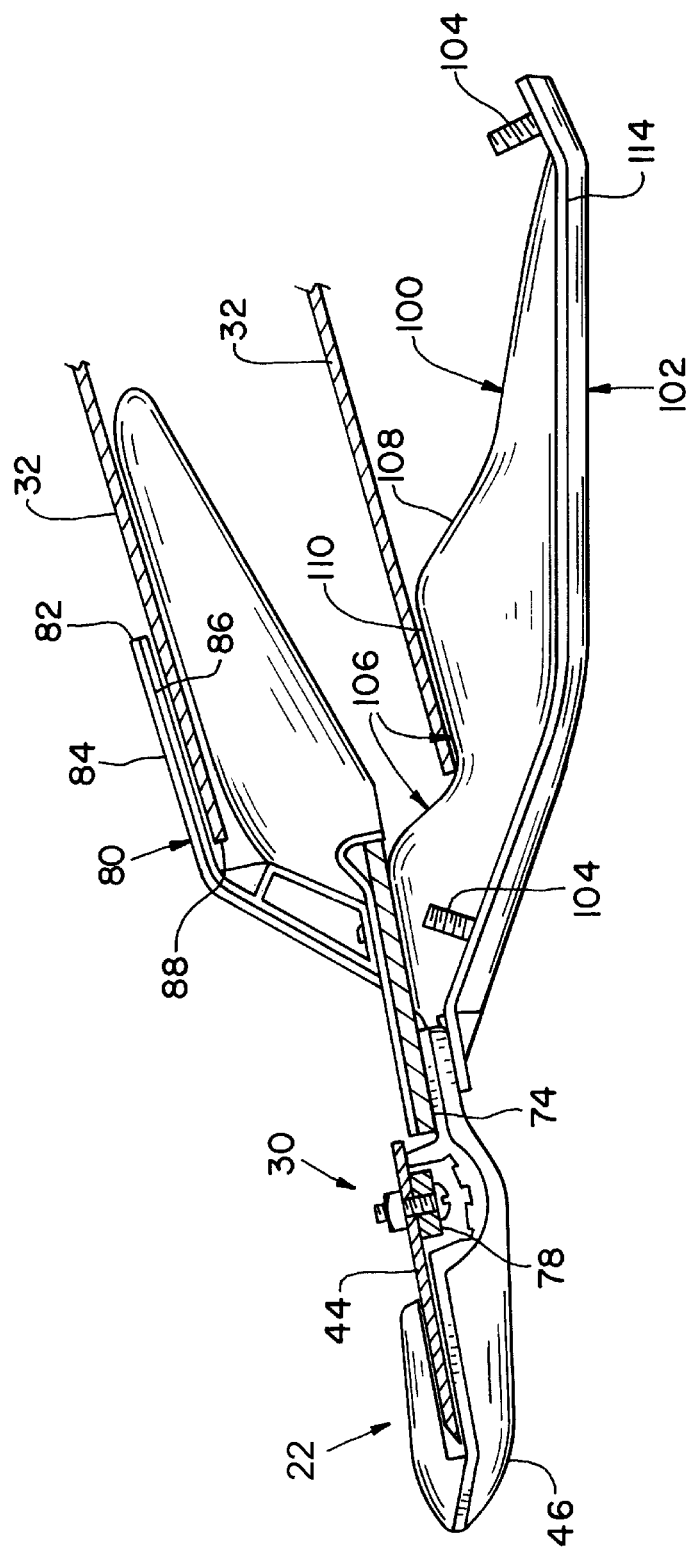
FIG. 7 is a fragmentary, side sectional view of the leading edge of FIGS. 5 and 6.
Figure 8:
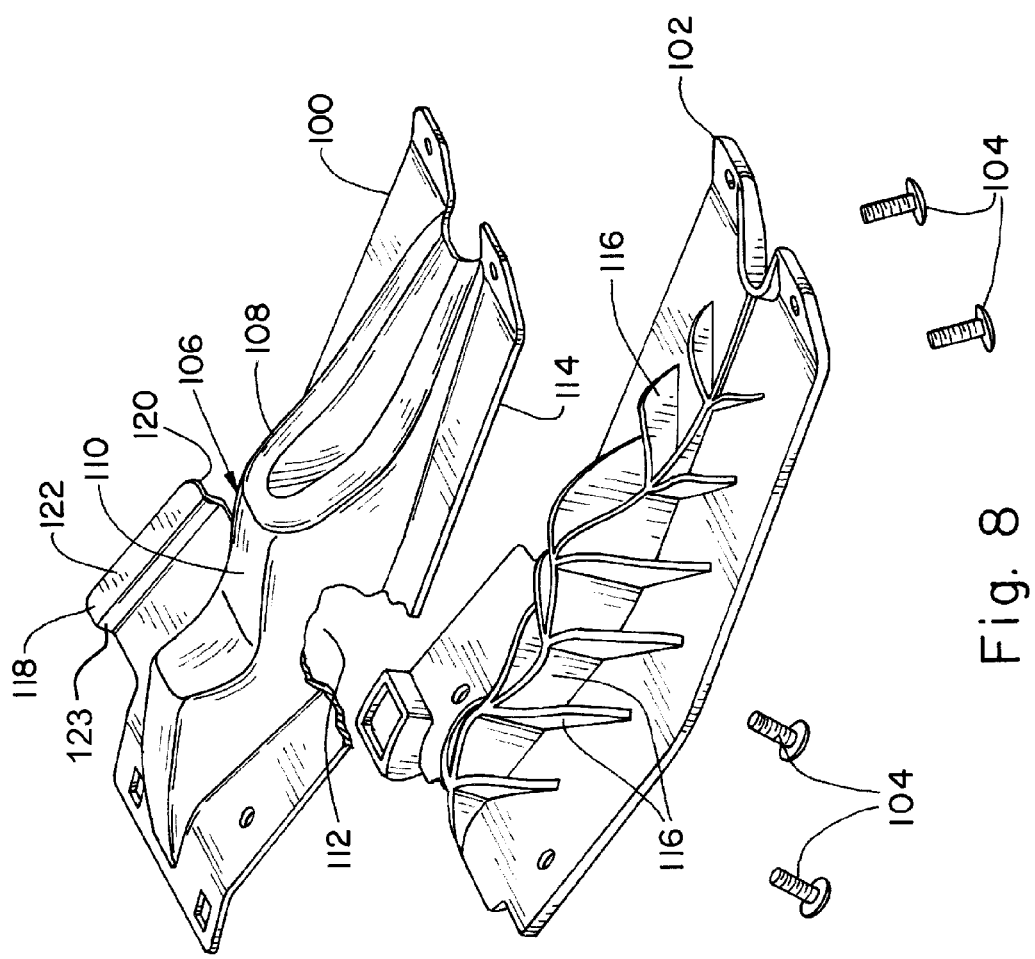
FIG. 8 is an exploded view of the skid shoe and skid plate shown in FIGS. 5-7.

Referring to FIGS. 4-8, each float arm 28 has a distal end adjacent the leading edge of cutting platform 12. The float arms 28 associated with each respective platform section 16, 18 and 20 are mounted with a corresponding flexible substrate 74 extending substantially across the width of that particular platform section 16, 18 or 20. Flexible substrate 74 for each particular platform section 16, 18 and 20 in essence forms the backbone to which the other modular components (to be described hereinafter) are mounted and allows flexibility of the platform section across the width thereof. In the embodiment shown, flexible substrate 74 is a steel plate with various mounting holes formed therein, and has a modulus of elasticity providing a desired degree of flexibility. The geometric configuration and material type from which flexible substrate 74 is formed may vary, depending upon the application.

The distal end of each float arm 28 is fastened to a knife guard 46, flexible substrate 74, crop ramp 76 and hold down 48. Cutterbar 30, including blades 44 carried by bar 78, is reciprocally carried by knife guards 46. Hold downs 48 which are spaced across the width of cutterbar 30 retain bar 78 within the corresponding grooves formed in knife guards 46.

Crop ramps 76 (FIG. 4) are overlapped but not rigidly attached to each other, thereby allowing flexure during harvesting operation. Each crop ramp 76 forms an upper ledge positioned above endless belt 32 which assists in maintaining the crop material on endless belt 32 as it is transported toward feeder housing 14. In the embodiment shown in FIG. 4, crop ramp 76 has a flat, angled orientation to assist in transport of the crop material from cutterbar assembly 22 to endless belt 32. For certain applications, it may be possible to eliminate crop ramps 76.

Belt guides 80 are formed with both a smooth upper transition and a smooth lower transition between adjacent belt guides 80, resulting in no or little accumulation of crop material above the belt guides, and no extra wear to the endless belt 32 below the belt guides. More particularly, each belt guide 80 has a rear edge 82 with an upper surface 84 and a lower surface 86. Lower surface 86 partially overlies a leading edge 88 of endless belt 32. Upper surface 84 and lower surface 86 each have a continuous, uninterrupted contour. That is, there are no abrupt discontinuities such as recesses or projections which might tend to accumulate crop material (on top) or wear the endless belt (below). In the embodiment shown, upper surface 84 and lower surface 86 are each generally planar, but could also be formed with a slight curvature (e.g., simple or compound curvature).

The direction of overlap between adjacent belt guides 80 is generally opposite to the travel direction of endless belt 32. However, by providing a smooth lower transition between adjacent belt guides 80, there is no undue wear to either the lip 94 or the endless belt 32. Further, the direction of overlap between adjacent belt guides 80 is in the same direction as the crop material movement across the upper surfaces thereof, resulting in little or no accumulation of crop material on top of belt guides 80.

Skid shoes 100 (FIGS. 5-8) are mounted at the forward end to flexible substrate 74, and thus extend rearwardly from cutterbar assembly 22. Skid plates 102 are detachably mounted to skid shoes 100 using fasteners 104, such as rivets, bolts or screws. Skid shoes 100 and skid plates 102 act in a conventional manner as a skid shoe below cutterbar assembly 22, but in addition also include an integral belt support 106 for supporting the leading edge 88 of the return run of endless belt 32.

More particularly, each skid shoe 100 includes an upper surface 108 defining belt support 106. Belt support 106 has a generally L-shaped cross-sectional configuration with a belt carrying surface 110 which is oriented generally parallel to the return run of the endless belt 32 when the leading edge of cutting platform 12 is in a lowered, working position. By combining belt support 106 into skid shoe 100, a separate component part in the form of a separate belt carrier for the return run of the endless belt 32 is eliminated. Since numerous belt carriers are utilized along the length of the return run of the endless belt, this results in considerable part reduction, simplicity of design, and cost savings.

Skid shoes 100 are movable relative to each other and are made as a bent metal part, preferably formed as a stamped metal part from sheet metal to reduce manufacturing costs. Configured as such, each skid shoe 100 includes a hollow cavity 112 at a lower surface 114 thereof. Each skid plate 102 is mounted to the lower surface 114 of a respective skid shoe 100, and covers hollow cavity 112. During use it is possible (and in fact likely) that skid plates 102 will impinge upon various ground projections, such as rocks, sticks, hard dirt clods, etc. To inhibit deformation upon impact with such objects, each skid plate 102 includes one or more reinforcing ribs 116 which extend into hollow cavity 112 and terminate adjacent lower surface 114 of hollow cavity 112. In the embodiment shown, each skid plate 102 includes a plurality of interconnected reinforcing ribs 116 which extend into hollow cavity 112 and terminate adjacent lower surface 114 of hollow cavity 112. Reinforcing ribs 116 allow skid plate 102 to be formed from plastic, such as with a casting process.

Each skid shoe 100 also includes an integral and laterally extending shield 118. Shield 118 has a lower end 120 which is positioned below the belt carrying surface 108 of belt support 106 so as to prevent crop and other material from impinging upon or accumulating at the leading edge of endless belt 32. Shield 118 has a lateral end with an overlap 122 which is configured to overlap but allow movement relative to an adjacent skid shoe 100. Overlap 122 includes a bent lip 123 which overlaps with an adjacent skid shoe 100.

During harvesting operation, float arms 28 are placed in a float state allowing free upward and downward movement as combine 10 traverses over the ground surface. Cutterbar assembly 22 moves up and down with float arms 28 on a localized basis, and crop ramps 76 and belt guides 80 move relative to each other to allow the flexibility at the leading edge of each platform section 16, 18 and 20. Belt guides 80 also cause each belt 32 to follow the cutterbar assembly by holding down on the upper surface of the belt as cutterbar assembly 22 locally dips downward. This prevents crop material from entering beneath belt 32. Skid shoes 100, with attached skid plates 102, move up and down on a localized basis depending upon the ground terrain, and also concurrently carry the leading edge of the return run of endless belt 32. Shields 118 extending from skid shoes 100 are positioned in front of the leading edge of endless belt 32, and prevent material from impinging upon or accumulating at the leading edge of the return run of endless belt 32. The present invention therefore provides a cutting platform which flexes to a high degree, efficiently moves crop material to the feeder housing, and maximizes harvest yield by better following the ground contour.

Having described the preferred embodiment, it will become apparent that various modifications can be made without departing from the scope of the invention as defined in the accompanying claims.

What is claimed is:

1. A cutting platform for use with an agricultural harvesting machine, comprising:
    at least one platform section, each said platform section including:
        a cutterbar assembly movable in a localized manner in upwards and downwards directions along the length of said at least one platform section;
        an endless belt having a leading edge;
        a plurality of skid shoes, each said skid shoe extending rearwardly from said cutterbar assembly and having an upper surface with a continuous uninterrupted contour defining a belt support for said leading edge of said endless belt wherein each said skid shoe has a hollow cavity in an area adjacent said belt support; and
        a plurality of skid plates, each said skid plate being detachably connected to a lower surface of a respective said skid shoe wherein each said skid plate has at least one reinforcing rib extending into said hollow cavity and terminating adjacent said lower surface of said skid shoe.

2. The cutting platform of claim 1, wherein each said skid shoe is a bent metal skid shoe.

3. The cutting platform of claim 1, wherein each said belt support is generally L-shaped in cross section.

4. The cutting platform of claim 1, wherein each said skid plate has a plurality of interconnected reinforcing ribs extending into said hollow cavity and terminating adjacent a lower side of said belt support.

5. The cutting platform of claim 1, wherein said skid shoes are movable relative to each other.

6. The cutting platform of claim 5, wherein each said skid shoe includes a laterally extending shield with a lower end which is positioned below a respective said belt support.

7. The cutting platform of claim 6, wherein each said shield has a lateral end with an overlap, each said overlap overlapping an adjacent said skid shoe.

8. The cutting platform of claim 7, wherein each said overlap includes a bent lip.

9. The cutting platform of claim 1, wherein each said skid shoe is made from metal, and each said skid plate is made from plastic.

10. The cutting platform of claim 9, wherein each said skid shoe is a stamped metal part, and each said skid plate is a cast plastic part.

11. An agricultural harvesting machine, comprising:
    a base unit including a feeder housing; and
    a cutting platform attached to said feeder housing, said cutting platform including at least one platform section, each said platform section having:
        a cutterbar assembly movable in a localized manner in upwards and downwards directions along the length of said at least one platform section;
        an endless belt having a leading edge;
        a plurality of skid shoes, each said skid shoe extending rearwardly from said cutterbar assembly and having an upper surface with a continuous uninterrupted contour defining a belt support for said leading edge of said endless belt; and,
        a plurality of skid plates, each said skid plate being detachably connected to a lower surface of a respective said skid shoe wherein each said skid shoe is a bent metal skid shoe with a hollow cavity in an area adjacent said belt support, and each said skid plate has at least one reinforcing rib extending into said hollow cavity and terminating adjacent a lower side of said skid shoe.

12. The agricultural harvesting machine of claim 11, wherein each said skid plate has a plurality of interconnected reinforcing ribs extending into said hollow cavity and terminating adjacent a lower surface of said belt support.

13. The agricultural harvesting machine of claim 11, wherein said skid shoes are movable relative to each other, and include a laterally extending shield with a lower end which is positioned below a respective said belt support.

14. The agricultural harvesting machine of claim 11, wherein each said shield has a lateral end with an overlap, each said overlap overlapping an adjacent said skid shoe.

* * * * *